US006488854B2

(12) United States Patent
O'Leary et al.

(10) Patent No.: US 6,488,854 B2
(45) Date of Patent: Dec. 3, 2002

(54) ACTIVATED SLUDGE WASTEWATER TREATMENT SYSTEM AND METHOD

(75) Inventors: Kevin P. O'Leary, Lemont, IL (US); Thomas H. Probst, Waukesha, WI (US); Jenchie Wang, Whitefish Bay, WI (US); David A. Wilson, Baraboo, WI (US); Henry J. Probst, Waukesha, WI (US)

(73) Assignee: Procorp, Inc., Wauwatosa, WI (US)

( * ) Notice: Subject to any disclaimer, the term of this patent is extended or adjusted under 35 U.S.C. 154(b) by 0 days.

(21) Appl. No.: 09/947,982

(22) Filed: Sep. 6, 2001

(65) Prior Publication Data

US 2002/0030003 A1 Mar. 14, 2002

Related U.S. Application Data

(60) Provisional application No. 60/231,199, filed on Sep. 7, 2000.

(51) Int. Cl.[7] .............................. C02F 3/12; C02F 3/30
(52) U.S. Cl. ................. 210/623; 210/626; 210/629; 210/630; 210/631; 210/195.3; 210/202; 210/206; 210/221.2; 210/259
(58) Field of Search .................. 210/605, 606, 210/609, 620, 623, 626, 628, 629, 631, 630, 195.1, 195.3, 202, 205, 206, 219, 221.1, 259, 263

(56) References Cited

U.S. PATENT DOCUMENTS

| 3,386,910 A | * | 6/1968 | Forrest |
| 3,390,077 A | * | 6/1968 | Forrest |
| 3,517,810 A | * | 6/1970 | Beer |
| 4,076,615 A | * | 2/1978 | Olesen et al. |
| 4,200,524 A | * | 4/1980 | Levin |
| 4,551,243 A | | 11/1985 | Martin |
| 4,749,494 A | * | 6/1988 | Tomoyasu et al. |
| 4,897,196 A | * | 1/1990 | Copa et al. |
| 4,956,093 A | | 9/1990 | Pirbazari et al. |
| 4,961,854 A | * | 10/1990 | Wittmann et al. |
| 5,304,308 A | * | 4/1994 | Tsumura et al. |
| 5,387,344 A | | 2/1995 | McCombs et al. |
| 5,453,205 A | | 9/1995 | Browne |
| 5,480,538 A | | 1/1996 | McCombs et al. |
| 5,514,282 A | | 5/1996 | Hibbard et al. |

* cited by examiner

*Primary Examiner*—David A. Simmons
*Assistant Examiner*—Fred Prince
(74) *Attorney, Agent, or Firm*—Reinhart Boerner Van Deuren S.C.

(57) ABSTRACT

A improved activated sludge system and method for treating wastewater containing contaminants is disclosed which offers a broad array of advantages over conventional activated sludge wastewater treatment systems, including smaller size, higher rates of operation, higher oxygen transfer efficiency, lower operating costs, and a substantially decreased level of excess sludge production. The improved activated sludge waste treatment system of the present invention has two processing tanks rather than the several tanks that are commonly found in activated sludge systems for treatment and sludge management equalizations, including anaerobic processes. The first processing tank is a contact tank which hosts a reaction which functions not merely to digest the maximum amount of contaminants, but instead to bind contaminants to the microorganisms through absorption, adsorption, precipitation, or digestion so that they can then be removed from the liquid in a solid/liquid separator. The activated sludge removed by the solid/liquid separator is then supplied to a digester tank containing a high concentration of activated sludge, where virtually complete digestion is achieved to minimize the volume of solids remaining. Activated sludge is provided from the digester tank to the contact tank to facilitate the reaction in the contact tank.

38 Claims, 2 Drawing Sheets

ACTIVATED SLUDGE WASTEWATER TREATMENT SYSTEM AND METHOD

This application claims the benefit of provisional application No. 60/231,199 filed on Sep. 7, 2000.

BACKGROUND OF THE INVENTION

FIELD OF THE INVENTION

The present invention relates generally to the field of treatment of wastewater, and more particularly to an improved system and method for treating wastewater containing contaminants which system and method offer a broad array of advantages over conventional activated sludge wastewater treatment systems, including smaller size, higher rates of operation, high oxygen transfer efficiency, lower operating costs, and a decreased level of excess sludge production.

With an increased awareness of problems with water quality, particularly those caused by the discharge of wastewater from industrial sources, has come a demand for improved equipment and methods to treat wastewater prior to discharging it into a sewer, as surface water, or to other destination for effluent discharge. While such treatment systems and methods are generally not required to produce potable water, they are increasingly required by law to enhance the quality of wastewater prior to discharging it as effluent. For industrial waste, this treatment process must typically remove certain type of pollutants such as organic contaminants, nitrogen and phosphorus, metals, and suspended solids.

The first wastewater treatment systems were of simple design, with a single container or tank being used for both treatment of the wastewater and the removal of solids from the wastewater, typically by allowing them to settle out. These early wastewater treatment systems were not aerated, and typically generated foul odors as a byproduct of the process utilized by these systems. Over time, these early wastewater treatment systems evolved into systems which use a popular type of wastewater treatment process referred to as the activated sludge wastewater treatment method.

The activated sludge wastewater treatment system and method use an aeration tank which is followed by a solid/liquid separator which acts as a secondary clarifier to remove separated solids from the liquid, which is discharged by the system. As its name suggests, the contents of the aeration tank are aerated and mixed to facilitate an aerobic reaction (a reaction taking place in the presence of oxygen) which is facilitated by the presence of activated sludge. This activated sludge, which is an accumulation of microorganism-rich residue contained in the solids which are separated from the liquid in the solid/liquid separator, is seeded into the incoming wastewater in the aeration tank. In conventional activated sludge wastewater treatment systems, the concentration of activated sludge solids is typically 2,000 to 5,000 milligrams per liter in the aeration tank.

The aerobic reaction which takes place in the aeration tank includes three types of phenomena—absorption, adsorption, and biological digestion. Absorption takes place when a contaminant is absorbed into the cell wall of the bacteria contained in the activated sludge. Adsorption, on the other hand, is a surface phenomenon which takes place when there is an interaction between a contaminant and the surface of the activated sludge whereby the contaminant adheres to the surface of molecules of the bacteria. Any one of these three phenomena will result in contaminants reacting with the bacteria contained in the activated sludge. Biological digestion takes place when the bacteria contained in the activated sludge consume waste constituents contained in the wastewater. Biological digestion can occur after the material has been absorbed or adsorbed.

As mentioned above, the reaction is an aerobic reaction occurring in the presence of oxygen, which decreases both the amount of time required for the reaction to occur and the level of foul odors produced by the reaction. Typically, the aeration and mixing may be produced by injecting compressed air or oxygen into the mixture, typically through diffuser devices located near the bottom of the aerator tank. As the air bubbles to the surface of the mixture, the diffused air provides both oxygen to the mixture and a vigorous mixing action. The amount of material contained in the wastewater may be characterized by the "chemical oxygen demand" or COD of the material. A chemical oxygen demand of one pound indicates that the material contained in the wastewater requires one pound of oxygen to degrade.

Air may also be added by the churning action of mechanical mixers located near the surface of the mixture contained in the aeration tank. In still another variation, mixing of the contents of the aeration tank may be caused by hydraulic pumping in which liquid is pumped out of the tank and back in through nozzles causing highly efficient mixing of the contents of the aeration tank. In a still further variation, air nozzles may be arranged around the liquid nozzles to further stimulate the mixing and simultaneously provide oxygen to the mixture. Still further variations include processes known as extended aeration and contact stabilization, both of which omit the primary settling step, and high-purity oxygen aeration, which can substantially reduce both the aeration time and the size of the aeration tank.

The conditions which are thus provided in the aeration tank promote the growth of the microorganisms introduced in the activated sludge with the resultant reaction removing contaminants from the wastewater. In conventional activated sludge technology, a predetermined period of time related to the strength of the wastewater and treatment objectives is required for the mixture to react in the aeration tank in a batch flow process. This time is required to allow the bacteria in the aeration tank to react with the contaminants contained in the wastewater, with much of the material being oxidized by the microorganisms. Generally, in conventional activated sludge processes, the contaminants are completely digested in the aeration tank.

The mixture is then allowed to flow from the aeration tank into the solid/liquid separator, which can be any of a number of different mechanical devices, all of which are well known in the art. The solid/liquid separator may be as simple as a secondary clarifier, which allows activated sludge to settle out by gravity. The clean liquid then overflows from the clarifier and it is discharged as secondary effluent, while the activated sludge may be separated out in a settling tank. The bacteria will tend to clump together and settle to the bottom of the settling tank, from which the activated sludge may be pumped out.

Some of the activated sludge will be recirculated back into the aeration tank, with this sludge being referred to as "return activated sludge" or RAS. The microorganisms contained in the return activated sludge are thus well acclimated to the environment in the aeration tank. The remaining activated sludge is treated and disposed of in a conventional solids processing technique which is well known to those skilled in the art. This sludge is referred to as "waste activated sludge" or WAS. In conventional activated sludge technology, the waste activated sludge may amount to as much as seventy percent of the sludge recovered in the solid/liquid separator.

The amount of excess activated sludge which is generated by an activated sludge waste treatment system may be controlled by a term referred to as "solid retention time" or SRT, which is the amount of time an average particle of solid material remains in the waste processing system. The solid retention time is inversely proportional to the relative volume of excess activated sludge which must be disposed of. Conventional extended activated sludge waste processing systems (designed for surface water discharge of effluent) have a solid retention time of approximately twenty days.

The excess solids produced may be determined by the yield of the activated sludge process multiplied by the mass of the contaminants removed. The yield may be measured in units of pounds of "chemical oxygen demand" or COD, which is a term commonly used to measure the amount of contaminants which are removed. Conventional extended activated sludge waste treatment systems produce a yield of approximately 0.25 pounds of "total suspended solids" or TSS of excess activated sludge per pound of chemical oxygen demand of yield. Less conservatively operated systems can produce yields of 0.7 pounds of total suspended solids per pound of chemical oxygen demand removed.

The waste activated sludge is typically accumulated, and may be further biologically processed and/or dewatered prior to its ultimate disposal. When stabilized, the waste activated sludge does not have an offensive odor, and can be handled without the requirement for special procedures. While the waste activated sludge thus does not constitute a health hazard, it will be appreciated that its removal does constitute a significant part of the cost of the wastewater treatment process. Similarly, while the waste activated sludge systems and methods currently known in the art present an advantageous way to remove contaminants from wastewater, they do, however, present a number of disadvantages as well.

First, presently known waste activated sludge systems are relatively large in size and therefore present a significant cost to initially purchase and install. In addition, the size of such presently known systems also mandates a relatively large amount of space in which to install them. In addition, another limitation of presently known waste activated sludge systems is that they can only be operated at a relatively low rate in order to achieve treatment objectives, with higher rates of operation resulting in reduced effectiveness of the systems. Also, as noted above, presently known waste activated sludge systems produce a substantial amount of waste activated sludge which must be disposed of. This high disposal burden presents both storage problems and a significant cost to transport the sludge away for disposal.

In addition, a substantial amount of energy is required in order to produce sufficient oxygen to drive the reaction in the aeration tank. These costs result either from electrical energy required to produce compressed air, or from the cost of purchasing oxygen which may be dispensed into the aeration tank. Another problem of conventional waste activated sludge systems is that they have only limited capacity to deal with spills; for example, if a substantial amount of milk is spilled at a dairy, a conventional waste activated sludge system will either have to be radically oversized to deal with the spill, or it will simply not be able to cope with a large volume spill such as this. Finally, operating a waste activated sludge system is a relatively complex process with a number of variables; it would be preferable to have a simpler system if possible.

It is accordingly the primary objective of the present invention that it provide an improved waste processing system which is smaller and therefore less expensive to initially purchase and install than a conventional waste activated sludge system. It is a closely related objective of the waste processing system of the present invention that it be capable of operating at a higher rate than comparable conventional systems to deal with increased loads of contaminants, or to produce higher quality effluent, or both. It is an additional objective of the waste processing system of the present invention that it produce a greatly reduced amount of sludge, thereby substantially reducing the cost of operation of the system.

It is still another objective of the waste processing system of the present invention that it require less energy to provide oxygen to the reaction to further reduce operating costs, and that it do so without adversely affecting either the reaction itself or the amount of time required to react the materials in the waste processing system. It is a further objective of the waste processing system of the present invention that it be capable of handling high-volume spills of highly concentrated biomaterials, thereby being capable of fully and effectively treating such spills without disrupting the normal operation of the waste processing system. It is a still further objective of the waste processing system of the present invention that it present a simplified operating process which is easy to operate and which presents relatively few potential problems in its day-to-day operation.

The waste treatment system of the present invention must also be of construction which is both durable and long lasting, and it should also require little or no maintenance to be provided by the user throughtout its operating lifetime. In order to enhance the market appeal of the waste treatment system of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, instead of having a single tank in which activated sludge reaction takes place with subsequent solids processing occurring in other tanks, two tanks having very different environments and different purposes are utilized in a waste processing system in order to achieve all of the objectives mentioned above without incurring a single significant disadvantage. These tanks are a contact tank in which an initial reaction directed to removing the contaminants from the solution occurs, and a digester tank having a very high concentration of activated sludge solids in which essentially all of the organic contaminants are digested. Located between the contact tank and the digester tank is a solid/liquid separator, which may be of virtually any conventional design.

The process utilized by the waste processing system of the present invention operates on a novel principle whereby the objective of treatment in the contact tank is not to digest most or all of the organic contaminants in the wastewater, but rather to facilitate the removal of most or all of the contaminants from suspension in the wastewater by using the microorganisms contained in the activated sludge. Thus, by a combination of absorption, adsorption, and digestion, or by precipitation, the activated sludge treatment occurring in the contact tank is focused on the removal of the contaminants from suspension in the wastewater so that they can be separated out in the solid/liquid separator. Thus, wastewater is introduced to the contact tank together with an appropriate amount of waste activated sludge.

The concentration of activated sludge solids in the mixture contained in the contact tank can vary approximately in 200 to 10,000 milligrams per liter, with a level of approximately 2,000 milligrams per liter being typical. For a given level of contaminants in wastewater, the concentration of activated sludge solids in the mixture in the contact tank is substantially lower than the concentration required in a conventional activated sludge aeration tank. Typically, the concentration of activated sludge solids in the contact tank is between approximately ten and fifty percent of the level required in an aeration tank to attain the same level of contaminant removal from similar quality wastewater.

The practical effect of this is that the loading rate of the contact tank is between approximately two and ten times higher than the rates which are achievable in a conventional activated sludge aeration tank. What this means in plain language is that the contact tank of the present invention is capable of removing a substantially higher level of contaminants from wastewater than has previously been possible in conventional activated sludge aeration tank waste treatment systems.

In the preferred embodiment, the contact tank has both mixing and aeration in order to stimulate the rapid removal of contaminants from the wastewater. The mixing and aeration may be achieved by use of air or oxygen pumped into the contact tank, or by mechanical mixing, or both. Alternately, hydraulic mixing may be used instead of mechanical mixing, together with the introduction of air to provide oxygen to facilitate the reaction. The process configuration can also be used in an aerobic mode, an anaerobic mode (a reaction occurring in the absence of oxygen), an anoxic mode (a reaction occurring in the absence of oxygen but with other electron donors such as nitrates, nitrites, or sulfates), or in any combination of these modes occurring consecutively where aeration can be continuous, intermittent, or not used at all. Mixing and aeration conditions can be varied to facilitate desired physical, chemical, and biological reactions.

It should be noted that the contact tank of the present invention is capable of operating in batch mode, continuous mode, or semi-continuous mode, all with equally high quality results. Following the reaction of the wastewater and the waste activated sludge in the contact tank, a high level of the contaminants contained in the wastewater have either been absorbed by, adsorbed to, or digested by the microorganisms contained in the activated sludge, or precipitated into the mixed solution. Thus, when the wastewater is directed into the solid/liquid separator, the microorganisms together with a high percentage of the contaminants are removed from the wastewater, with the cleansed water being discharged from the solid/liquid separator as effluent.

In another significant differentiation from previously noted aeration tank waste treatment technology, all of the particulates which are separated in the solid/liquid separator are directed into the digester tank. As will be appreciated following a brief discussion of the operation of the digester tank, the production of particulates by the waste processing system of the present invention is so much lower than that of previously known aeration tank waste treatment systems that it is not necessary to continuously divert a large portion of the solids produced by the solid/liquid separator.

The concentration of activated sludge solids in the digester tank is quite high, generally being on the order of 5,000 to 100,000 milligrams per liter, with 40,000 milligrams per liter being typical. In fact, the only limitation on the concentration of activated sludge solids in the digester tank is that the mixture must be of sufficient viscosity as to be amenable to being pumped. In the preferred embodiment, whenever the concentration of activated sludge in the digester tank is so high that the mixture may not be easily pumped, it may be watered down somewhat by directing a sufficient quantity of wastewater into the digester tank so as to improve the pumpability of the mixture.

In the preferred embodiment for an aerobic reaction, the digester tank also has both mixing and aeration in order to stimulate the rapid digestion of contaminants contained in the activated waste mixture. The mixing and aeration may be achieved by use of air or oxygen pumped into the digester tank, or by mechanical mixing, or both. Alternately, hydraulic mixing may be used instead of mechanical mixing, together with the introduction of air to provide oxygen to facilitate digestion. The mixing and aeration conditions may be varied to facilitate desired physical, chemical, and biological reactions. Like the contact tank, the digester tank can be operated in an aerobic mode, an anaerobic mode, an anoxic mode, or in any combination of these modes occurring consecutively where aeration can be continuous, intermittent, or not used.

In many embodiments of the present invention, the size of the digester tank will be substantially larger than the size of the contact tank. While this is not necessary per se, it is generally the case due to the fact that the increased efficiency of the reaction process in the contact tank makes it possible to have a contact tank which is substantially smaller than the aeration tanks used by previously known activated waste treatment processes. In addition, since it is an objective of the improved waste processing system of the present invention to create an environment in the digester tank to take the digestion process to the maximum level possible, and to ultimately reduce solid waste to the minimum level possible, having a larger digester tank is advantageous.

The completion of the digestion process in the digester tank thereby tremendously reduces the volume of excess activated sludge solids which must be disposed of. This reduction is produced by the large "solid retention time" or SRT, which is the amount of time an average particle of solid material remains in the waste processing system. The solid retention time is inversely proportional to the volume of excess activated sludge solids which must be disposed of. The waste processing system of the present invention has a solid retention time in excess of 200 days, and has produced excess activated sludge yields of less than 0.05 pounds of total suspended solids per pound of chemical oxygen demand removed. In addition, the waste processing system of the present invention also has a higher oxygen transfer efficiency, resulting in additional savings in operating costs.

The processing in the contact tank is maintained by pumping sufficient activated sludge from the digester tank into the contact tank. As mentioned above, the concentration of activated sludge required in the mixture contained in the contact tank is substantially lower than the concentration required by previously known aeration tank waste treatment systems. The activated sludge contained in the digester tank is monitored to periodically check the concentration of bacteria contained therein. Since essentially all of the digestible matter is consumed in the digester tank, the level of indigestible matter will eventually build up to the point where it reduces the concentration of the bacteria in the digester tank to an unsatisfactory level. It is at this point that excess activated sludge will typically be removed from the digester tank.

In alternative embodiments of the waste processing system of the present invention, a number of other features may be utilized. It may be desirable to provide conditioning agents to enhance or optimize the processing in the contact tank, the solid/liquid separator, or the digester tank. For example, it may be desirable to introduce a conditioning agent into the contact tank in order to maintain an optimal level of pH to facilitate the reaction of the bacteria in the contact tank. This may be accomplished by measuring the pH in the contact tank and pumping a sufficient amount of a first conditioning agent into the contact tank in order to optimize the pH in the contact tank.

With some kinds of solid/liquid separators, it may be desirable to introduce a conditioning agent to enhance separation of the solids from the liquid in the separator. For example, if a dissolved air floatation separator or DAF is used, it may be desirable to use a chemical flocculent. Dissolved air floatation separators, which use air bubbles to entrain clumps of solids contained in the liquid, may use a flocculent material which causes the solids to initially aggregate. Such flocculent are typically polymers such as a cationic emulsion polymer, which has large organic molecules which, when dispersed in the wastewater prior to its introduction into the dissolved air floatation separator, facilitates bridging between bacterial solids through an electrical charge phenomenon.

In addition, it may be useful to provide supplements to the contact digester tank, either using nutrients or additional microorganisms to enhance the environment in the digester tank. The addition of a second type of microorganism which will selectively consume primary microorganisms which have died may be useful. Nutrients which may be added to increase the efficiency of digestion include nitrogen, which may comprise fertilizer, urea, or ammonium chloride. Precipitation agents may be added to either tank to remove chemical species, such metals or nutrients.

Finally, it may be desirable to add enzymes or surfactants to the contact tank or the digester tank or both to improve the reaction process to remove contaminants from the wastewater. The addition of surfactants may help the absorption or adsorption processes. The addition of enzymes may enable a modification of the structure of contaminants making them more amenable to the reaction process. For example, the addition of an enzyme may make it easier to remove a food oil from wastewater by solubilizing the oil.

It may therefore be seen that the present invention teaches an improved waste processing system which is smaller and therefore less expensive to initially purchase and install than a conventional waste activated sludge system. The waste processing system of the present invention is also capable of operating at a higher rate than comparable conventional systems to deal with increased loads of contaminants, or of producing higher quality effluent, or both. The waste processing system of the present invention also produces a greatly reduced amount of sludge, thereby substantially reducing the cost of operation of the system.

The waste processing system of the present invention requires less energy to provide oxygen for the reaction, thereby further reducing operating costs, and it does so without adversely affecting either the reaction itself or the amount of time required to react the materials in the waste processing system. The waste processing system of the present invention is also capable of handling high-volume spills of highly concentrated biomaterials, and is thereby capable of fully and effectively treating such spills without disrupting the normal operation of the waste processing system. The waste processing system of the present invention presents a simplified operating process which is easy to operate and which presents virtually no significant problems in its day-to-day operation.

The waste processing system of the present invention is of a construction which is both durable and long lasting, and which will require little or no maintenance to be provided by the user throughout its operating lifetime. The waste processing system of the present invention is also of inexpensive construction to enhance its market appeal and to thereby afford it the broadest possible market. Finally, all of the aforesaid advantages and objectives are achieved by the waste processing system of the present invention without incurring any substantial relative disadvantage.

DESCRIPTION OF THE DRAWINGS

These and other advantages of the present invention are best understood with reference to the drawings, in which.

DESCRIPTION OF THE PREFERRED EMBODIMENT

Figure 1:
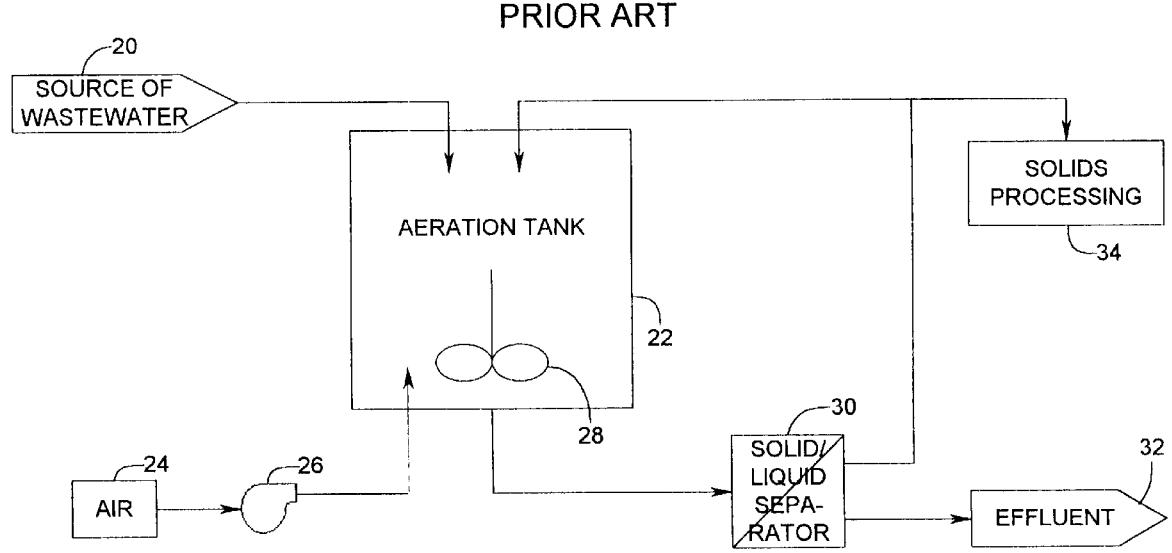
FIG. 1 is a somewhat schematic process flow diagram of a prior art activated sludge waste processing system used to remove contaminants from wastewater in which an aeration tank is used to process the contaminants and a solid/liquid separator is used to retain the solids while passing the processed liquid as effluent.

Prior to a discussion of the preferred embodiment of the present invention, it is useful to briefly discuss the previously known activated sludge waste processing system. Referring to FIG. 1, such a previously known system is illustrated. Wastewater containing contaminants enters a system from a source of wastewater 20, from which it flows into an aeration tank 22. Activated sludge is also introduced into the aeration tank 22, with the source of activated sludge being from a recirculation of activated sludge produced during the waste treatment process; accordingly, the activated sludge introduced into the aeration tank 22 would generally be referred to as return activated sludge. Typically, the concentration of activated sludge solids in conventional activated sludge waste treatment systems is between approximately 2,000 to 5,000 milligrams per liter.

Oxygen is introduced into the aeration tank 22, typically by introducing compressed air into the bottom of the aeration tank 22. This may be accomplished by providing air 24 to a compressor pump 26, which provides the compressed air to the bottom of the aeration tank 22. Other ways of introducing oxygen into the aeration tank 22 are well known in the art, and include supplying pure oxygen to the aeration tank 22, or using a mechanical aeration device to create turbulence in the wastewater mix contained in the aeration tank 22 to introduce air therein. Since conventional activated sludge waste treatment systems rely on the use of oxygen to facilitate the reaction in the aeration tank 22, they operate using the principles of aerobic reactions.

In addition to providing the compressed air to the bottom of the aeration tank 22, the conventional activated sludge waste treatment system illustrated in FIG. 1 also includes a mechanical mixer 28 which is used to continually circulate the wastewater mix in the aeration tank 22. Conventional activated sludge waste treatment systems typically attempt to have almost all of the digestion occur in the aeration tank 22 (since that is the only place in a conventional system where digestion can in fact take place), and require at least a certain amount of time which is dependent upon the concentration of contaminants in the wastewater, the desired degree of removal of the contaminants from the wastewater, and the concentration of activated sludge in the aeration tank 22.

From the aeration tank 22, the wastewater and contaminants flow into a solid/liquid separator 30, which may be any of a wide variety of different solid/liquid separator devices, all of which are well known in the art. The cleaned liquid flows out of the solid/liquid separator 30 as an effluent flow 32. The separated activated sludge is removed from the solid/liquid separator 30, and then follows one of two paths.

The amount of activated sludge which is required to resupply the aeration tank 22 (the return activated sludge) flows into the aeration tank 22. The rest of the activated sludge (the waste activated sludge) which is removed from the solid/liquid separator 30 is placed in a solids processing location 34, from which it will be dewatered and disposed of. As mentioned above, as much as seventy percent of the activated sludge removed from the solid/liquid separator 30 is waste activated sludge, with only perhaps thirty percent of the activated sludge being reused as return activated sludge. As also mentioned above, most conventional extended activated sludge waste processing systems have a solid retention time of only approximately twenty days, and produce a yield of 0.25 to 0.7 pounds of total suspended solids per pound of chemical oxygen demand.

It will of course be appreciated by those skilled in the art that the description of a prior art activated sludge waste processing system is described in its simplest context. Such systems may include thickening, digestion, and/or dewatering as well, none of which are described specifically in the above simplified description. Thus, the single aeration tank 22 shown may be followed by several solids processing units which may be preceded by an equalization tank and sedimentation/clarification tanks.

Figure 2:
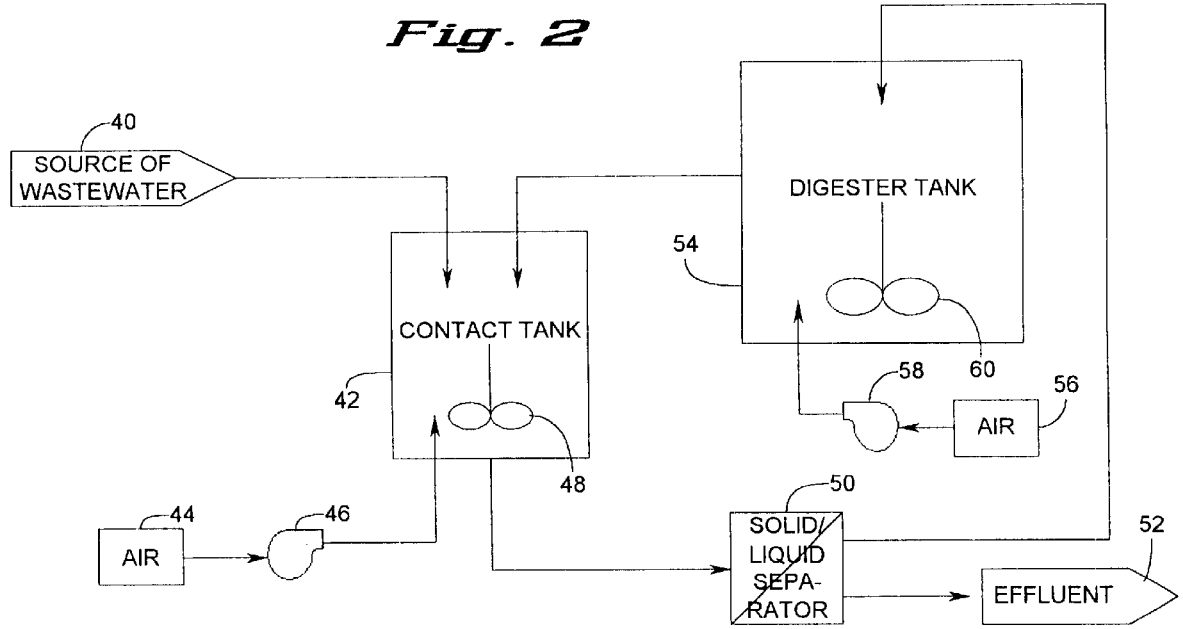
FIG. 2 is a somewhat schematic process flow diagram of an improved activated sludge waste processing system constructed according to the teachings of the present invention which is also used to remove contaminants from wastewater, showing a contact tank used to initiate a high rate aerobic reaction and a digester tank having a high concentration of activated sludge to complete the digestion of contaminants, with a solid/liquid separator being used to retain the solids while passing the processed liquid as effluent.

Turning now to FIG. 2, the basic configuration for the waste processing system of the present invention is illustrated. As mentioned above, the most significant change over previously known activated sludge waste treatment systems, such as the one described in FIG. 1 above, is that the system illustrated in FIG. 2 has two processing tanks rather than a single tank followed by several solids processing units and perhaps preceded by equalization, and sedimentation/ clarification units. Wastewater containing contaminants enters the system from a source of wastewater 40, from which it flows into a contact tank 42, which has the objective of removing a substantial amount of the contaminants from suspension in the wastewater so that they can be separated out in a solid/liquid separator to be mentioned below. It is particularly noteworthy that the objective of the reaction taking place in the contact tank 42 is not necessarily to digest the maximum amount of contaminants, but merely to bind them to the microorganisms through absorption, adsorption, or digestion.

Activated sludge is also introduced into the contact tank 42, with the source of activated sludge being from a recirculation of activated sludge accumulated from a second tank (to be discussed below). The concentration of activated sludge solids in the contact tank 42 in the waste processing system of the present invention is between approximately 200 to 10,000 milligrams per liter, with a level of 1,500 milligrams per liter being typical. As noted above, for a particular level of contaminants in the wastewater, the concentration of activated sludge solids in the mixture in the contact tank 42 is substantially lower than the concentration found in the conventional activated sludge aeration tank 22 (FIG. 1).

The concentration of activated sludge solids in the contact tank 42 is between ten and fifty percent of the level required in the aeration tank 22 (FIG. 1) to attain the same level of contaminant removal from similar quality wastewater. The loading rate of the contact tank 42 is thus two to ten times higher than the rates which are achievable in the conventional activated sludge aeration tank 22, making the contact tank 42 of the present invention capable of removing a substantially higher level of contaminants from wastewater than was possible with the conventional activated sludge aeration tank waste treatment system illustrated in FIG. 1.

Oxygen may be introduced into the contact tank 42, typically by introducing compressed air into the bottom of the contact tank 42. This is accomplished in the embodiment illustrated in FIG. 2 by providing air 44 to a compressor pump 46 which provides the compressed air to the bottom of the contact tank 42. The process can also be operated in an anaerobic mode, an anoxic mode, or in any combination of these modes occurring consecutively where aeration can be continuous, intermittent, or not used. A mechanical mixer 48 is used to continually circulate the wastewater mix in the contact tank 42. As noted previously, mixing and aeration conditions can be varied to facilitate desired physical, chemical, and biological reactions.

The contact tank 42 is capable of operating in batch mode, continuous mode, or semi-continuous mode, all with equally high-quality results. The objective of the contact tank 42 is that a high level of the contaminants contained in the wastewater are either absorbed by, adsorbed by, or digested by the microorganisms contained in the activated sludge, or precipitated into the mixed solution, by the time that the wastewater leaves the contact tank 42.

From the contact tank 42, the wastewater and contaminants flow into a solid/liquid separator 50, which may be any of a wide variety of different solid/liquid separator devices which are well known in the art. The cleaned liquid flows out of the solid/liquid separator 50 as an effluent flow 52. The separated activated sludge is removed from the solid/liquid separator 50 and is then directed to a digester tank 54.

The other significant manner in which the waste processing system of the present invention differs from the previously known activated waste treatment system illustrated in FIG. 1 may now be discussed. The digester tank 54 has such a high level of active waste present therein that it completely digests the contaminants present in the digester tank 54 and autodigests the microorganisms. Thus, the production of particulates by the waste processing system of the present invention is only a fraction of that of previously known waste treatment systems such as the one illustrated in FIG. 1. Accordingly, it is not necessary to continuously divert a large portion of the contaminants produced by the solid/liquid separator 50 for disposal.

In a preferred embodiment, the concentration of activated sludge solids in the digester tank 54 is generally between approximately 5,000 and 100,000 milligrams per liter, and is typically approximately 40,000 milligrams per liter. This high concentration of activated sludge solids ensures the complete digestion of all digestible contaminants contained therein and performs digestion of a large fraction of microorganisms produced.

In order to enhance digestion in the digester tank 54, oxygen may be introduced therein, typically by introducing compressed air into the bottom of the digester tank 54. This is accomplished in the embodiment illustrated in FIG. 2 by providing air 56 to a compressor pump 58 which provides the compressed air to the bottom of the digester tank 54. A mechanical mixer 60 is used to continually circulate the wastewater mix in the digester tank 54. As noted previously with respect to the contact tank 42, mixing and aeration conditions in the digester tank 54 can be varied to facilitate desired physical, chemical, and biological reactions A portion of the activated sludge in the digester tank 54 is thus recirculated to the contact tank 42 as needed. This completes the closed loop system of the waste processing system of the present invention. It will be immediately appreciated by those skilled in the art that the waste processing system of the present invention presents a number of advantages over the previously known activated sludge waste processing system illustrated in FIG. 1.

As suggested above, the size of the digester tank 54 may be substantially larger than the size of the contact tank 42. For a given wastewater treatment situation, the system illustrated in FIG. 2 can be substantially smaller (and cheaper to purchase and install) than the system illustrated in FIG. 1. In the system of FIG. 2 produces less than one-tenth of the volume of solid waste produced by the system illustrated in FIG. 1. This reduces the cost of disposal of the solid waste significantly, and is a further economic incentive presented by the waste processing system of the present invention illustrated in FIG. 2 over previously known active waste treatment systems such as the one illustrated in FIG. 1.

Figure 3:
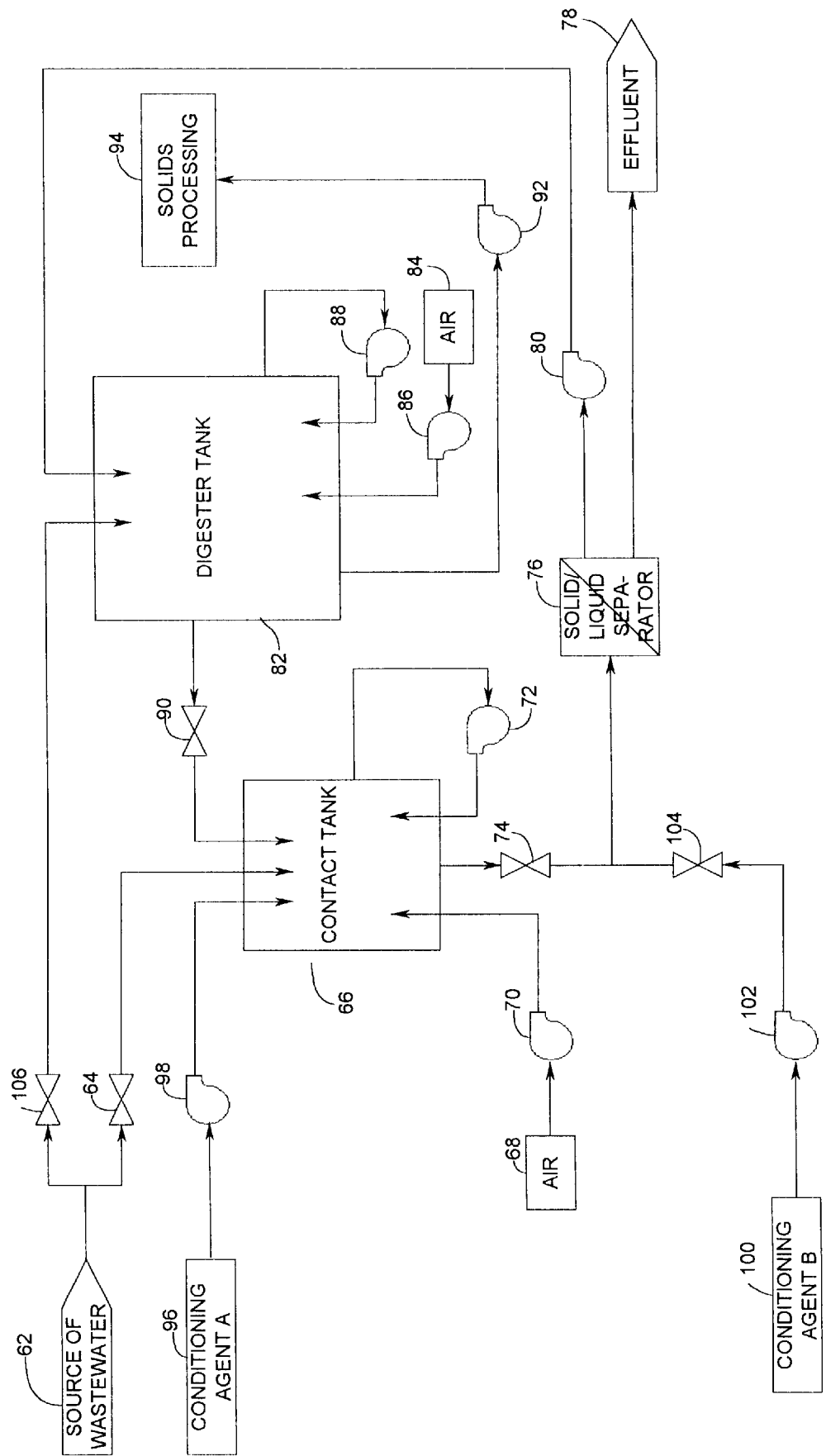
FIG. 3 is a somewhat schematic process flow diagram of an alternate embodiment improved activated sludge waste processing system having a number of embellishments not present in the system illustrated in FIG. 2, including aeration and hydraulic flow mixing in both the contact tank and the digester tank, the use of conditioning agents in both the contact tank and the solid/liquid separator, and the potential to use a bypass line directly from the source of wastewater to the digester tank for use in dealing with spills.

Moving finally to FIG. 3, a system which is similar to the waste processing system of the present invention illustrated in FIG. 2 is shown, with a number of additional embellishments and alternate embodiments illustrated therein. It will be appreciated by those skilled in the art that all of the details of operation of the system of FIG. 3 are not discussed where they are identical to those of the system illustrated in FIG. 2; accordingly, those details not discussed in conjunction with FIG. 3 should be (and in fact are) identical to those of the system illustrated in FIG. 2. Wastewater containing contaminants enters the system of FIG. 3 from a source of wastewater 62, from which it flows through a valve 64 into a contact tank 66. The valve 64 functions to control the entry of wastewater from the source of wastewater 62 to the contact tank 66.

Activated sludge is also introduced into the contact tank 66 (in a manner which will be described below), with the source of activated sludge being from a recirculation of activated sludge stored in a second tank to be discussed below. As is the case with the contact tank 42 of the system of FIG. 2, the contact tank 66 has the objective of removing a substantial amount of the contaminants from suspension in the wastewater so that they can be separated out in a solid/liquid separator to be mentioned below. Again, the objective of the reaction taking place in the contact tank 66 is not to digest the maximum amount of contaminants, but merely to bind them to the microorganisms through absorption, adsorption, precipitation, or digestion.

Oxygen may be introduced into the contact tank 66 by introducing compressed air into the bottom of the contact tank 66. This may be accomplished by providing air 68 to a compressor pump 70 which provides the compressed air to the bottom of the contact tank 66. Rather than the mechanical mixer 48 which is used in the system illustrated in FIG. 2, the system of FIG. 3 instead uses hydraulic mixing. A pump 72 withdraws the wastewater mixture from the contact tank 66 at a first location, and introduces it to the contact tank 66 under pressure at a second location, thereby continually circulating the wastewater mixture in the contact tank 66. As noted previously, mixing and aeration conditions can be varied and any other mixing/aeration system may also be used to facilitate the desired physical, chemical, and biological reactions. The process can be operated in an anaerobic mode, an anoxic mode, or in any combination of these modes occurring consecutively where aeration can be continuous, intermittent, or not used. Likewise, the process may be operated in batch, continuous, or semi-continuous modes to facilitate wastewater flow or treatment objectives.

By the time that the waste mixture leaves the contact tank 66, a high level of the contaminants contained in the wastewater mixture have been absorbed by, adsorbed by, or digested by the microorganisms contained in the activated sludge. A valve 74 is used to control the flow of the wastewater mixture from the contact tank 66 to a solid/liquid separator 76. The solid/liquid separator 76 may also be any of a wide variety of different solid/liquid separator devices which are well known in the art. In an embodiment which is used for the purpose of a later discussion, it will be assumed that the solid/liquid separator 76 is a dissolved air flotation system.

The cleaned liquid flows out of the solid/liquid separator 76 as an effluent flow 78. The separated activated sludge removed from the solid/liquid separator 50 is then pumped by a pump 80 from the solid/liquid separator 76 to a digester tank 82. Like the digester tank 54 of the system illustrated in FIG. 2, the digester tank 82 has such a high level of activated waste solids present therein that it completely digests the contaminants present in the digester tank 82.

In order to enhance digestion in the digester tank 82, oxygen may be introduced therein, typically by introducing compressed air into the bottom of the digester tank 82. This is accomplished by providing air 84 to a compressor pump 86 which provides the compressed air to the bottom of the digester tank 82. Rather than the mechanical mixer 60 which is used in the system illustrated in FIG. 2, the system of FIG. 3 instead uses hydraulic mixing in the digester tank 82. A pump 88 withdraws the activated sludge from the digester tank 82 at a first location, and introduces it to the digester tank 82 under pressure at a second location, thereby continually circulating the activated sludge in the digester tank 82. As noted previously with respect to the digester tank 54, mixing and aeration conditions in the digester tank 82 can be varied to facilitate desired physical, chemical, and biological reactions. The process can be operated in an anaerobic mode, an anoxic mode, or in any combination of these modes occurring consecutively where aeration can be continuous, intermittent, or not used.

A portion of the activated sludge in the digester tank 82 is thus recirculated to the contact tank 66 as needed, traveling through a valve 90, which is used to control the flow of return activated sludge from the digester tank 82 to the contact tank 66. This completes the closed loop portion of the embodiment of the waste processing system of the present invention illustrated in FIG. 3.

From time to time it will be necessary to remove some of the activated sludge from the digester tank 82. This is generally required only when the level of inert solids contained in the digester tank 82 builds up to the point where the activated sludge is unduly reduced in strength. Typically, this occurs where the activated sludge solids are twenty-five percent or less of the total sludge solids contained in the digester tank 82. When this occurs, some of the sludge contained in the digester tank 82 will be pumped out of the digester tank 82 by a pump 92 to a solids processing location 94, where it can be dewatered and then disposed of. The remaining sludge contained in the digester tank 82 may then be diluted somewhat by adding wastewater in a manner which will become apparent below.

The embodiment illustrated in FIG. 3 also includes a number of other embellishments, which will now be described. One of the first embellishments regards adding a conditioning agent to optimize or enhance the processing of the wastewater mixture contained in the contact tank 66. In order to do so, a first conditioner is supplied from a source of the first conditioner 96, from which it is pumped into the contact tank 66 by a pump 98 on an as-needed basis.

The first conditioning agent may be, for example, a chemical to adjust the level of pH in the contact tank 66. It will be appreciated by those skilled in the art that in order for the reaction which takes place in the contact tank 66 to occur in an optimal fashion, the pH must be within appropriate boundaries. Typically, the pH must be between four and eleven, and is most commonly between six and nine, and is thought to be optimal at a range between 6.5 and 8.5.

Thus, by periodically measuring the pH of the wastewater mixture contained in the contact tank 66, and by then correcting it by adding the first conditioning agent, the pH can be kept at an optimal level to enhance the reaction occurring in the contact tank 66. It will also be appreciated by those skilled in the art that two conditioning agents and (one acid and one alkaline) could be separately pumped into the contact tank 66 to facilitate the adjustment of pH in either direction.

Similarly, while the addition of a conditioning agent is not illustrated with respect to the digester tank 82, those skilled in the art will appreciate that one or more conditioning agents could be added to the digester tank 82 as well. Conditioning agents likely to be added to the digester tank 82 could include, for example, nitrogen-based nutrients (such as fertilizer, urea, or ammonium chloride) to improve the efficiency of digestion or a second strain of microorganisms to consume primary microorganisms which may have died.

In addition, those skilled in the art will appreciate that other conditioning agents which may be useful to add to either the contact tank 66 or the digester tank 82, or both, may be enzymes which are surfactants to improve the reaction process in the contact tank 66 or the compressor pump 86, or both.

If the solid/liquid separator 76 is, for example, a dissolved air flotation separator, it may be desirable to introduce a second conditioning agent to enhance the separation of solids from the liquid mixture contained in the solid/liquid separator 76.

In order to do so, a second conditioner is supplied from a source of the second conditioner 100, from which it is pumped with a pump 102 through a valve 104 into the solid/liquid separator 76 on an as-needed basis. The second conditioner may be, for example, a chemical flocculent material which causes the solids to clump together. One such flocculent which may be used is a cationic emulsion polymer, which has large organic molecules which facilitate bridging between bacterial solids through an electrical charge phenomenon. Chemical agents may be added to either tank to facilitate precipitation of chemical species, such as metals or nutrients.

Finally, one advantage of the waste processing system of the present invention which has been mentioned but not described in detail is the ability of the improved waste treatment system of the present invention to deal with large spills. This capability is provided for in the system illustrated in FIG. 3 by a valve 106 which is used to allow spills contained in wastewater from the source of wastewater 62 to be diverted directly into the digester tank 82. Since the digester tank 82 contains a high concentration of microorganisms, it is capable of dealing with even high-volume, concentrated spills. Accordingly, this represents yet another advantage of the waste processing system of the present invention over the previously known waste treatment system illustrated in FIG. 1. In addition to being used for spills, the valve 106 can also be used to supply wastewater from the source of wastewater 62 into the digester tank 82 to dilute the activated sludge contained therein whenever it becomes too thick to pump.

It may therefore be appreciated from the above detailed description of the preferred embodiment of the present invention that it teaches an improved waste processing system which is smaller and therefore less expensive to initially purchase and install than a conventional waste activated sludge system. The waste processing system of the present invention is also capable of operating at a higher rate than comparable conventional systems to deal with increased loads of contaminants, or of producing higher quality effluent, or both. The waste processing system of the present invention also produces a greatly reduced amount of sludge, thereby substantially reducing the cost of operation of the system.

The waste processing system of the present invention requires less energy to provide oxygen for the reaction, thereby further reducing operating costs, and it does so without adversely affecting either the reaction itself or the amount of time required to react the materials in the waste processing system. The waste processing system of the present invention is also capable of handling high-volume spills of highly concentrated biomaterials, and is thereby capable of fully and effectively treating such spills without disrupting the normal operation of the waste processing system. The waste processing system of the present invention presents a simplified operating process which is easy to operate and which presents virtually no significant problems in its day-to-day operation.

The waste processing system of the present invention is of a construction which is both durable and long lasting, and which will require little or no maintenance to be provided by the user throughout its operating lifetime. The waste processing system of the present invention is also of inexpensive construction to enhance its market appeal and to thereby afford it the broadest possible market. Finally, all of the aforesaid advantages and objectives are achieved by the waste processing system of the present invention without incurring any substantial relative disadvantage.

Although an exemplary embodiment of the waste processing system of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A waste processing system for removing contaminants from a wastewater stream, comprising:

a first container having wastewater from said wastewater stream admitted thereinto, activated sludge being introduced into said first container to react with said wastewater contained therein to cause said contaminants to bind to microorganisms contained in said activated sludge;

a solid/liquid separator for receiving said wastewater containing said contaminants bound to said microorganisms from said first container, said solid/liquid separator having as a first output wastewater from which said contaminants bound to said microorganisms have been removed, said solid/liquid separator also having as a second output an activated sludge including said contaminants bound to said microorganisms; and a second container for receiving said activated sludge including said contaminants bound to said microorganisms from said solid/liquid separator, said second container containing a sufficiently high concentration of activated sludge to ensure substantially complete digestion of said contaminants, said activated sludge in said second container comprising the source of said activated sludge which is introduced into said first container.

2. A waste processing system as defined in claim 1, wherein the concentration of activated sludge solids in said first container is between approximately 200 and 10,000 milligrams per liter.

3. A waste processing system as defined in claim 2, wherein the concentration of activated sludge solids in said first container is approximately 1,500 milligrams per liter.

4. A waste processing system as defined in claim 1, additionally comprising:

apparatus for introducing an electron donor substance into at least one of said first container and said second container.

5. A waste processing system as defined in claim 4, wherein said electron donor is oxygen.

6. A waste processing system as defined in claim 4, wherein said electron donor is compressed air containing oxygen.

7. A waste processing system as defined in claim 6, wherein said apparatus for introducing comprises:

a compressor pump which provides compressed air to said first container.

8. A waste processing system as defined in claim 4, wherein said apparatus for introducing comprises:

first apparatus for introducing an electron donor substance into said first container; and second apparatus for introducing an electron donor substance into said second container.

9. A waste processing system as defined in claim 1, additionally comprising:

mixing apparatus to mix a mixture contained in at least one of said first container and said second container.

10. A waste processing system as defined in claim 9, wherein said mixing apparatus comprises:

a mechanical mixer to continually circulate the mixture contained in said at least one of said first container and said second container.

11. A waste processing system as defined in claim 9, wherein said mixing apparatus comprises:

a pump to continually circulate the mixture contained in said at least one of said first container and said second container.

12. A waste processing system as defined in claim 9, wherein said mixing apparatus comprises:

first mixing apparatus to mix the mixture contained in said first container; and second mixing apparatus to mix the mixture contained in said second container.

13. A waste processing system as defined in claim 1, wherein the concentration of activated sludge solids in said second container is between approximately 5,000 and 100,000 milligrams per liter.

14. A waste processing system as defined in claim 13, wherein the concentration of activated sludge solids in said second container is approximately 40,000 milligrams per liter.

15. A waste processing system as defined in claim 1, wherein the volume of said second container is substantially larger than the volume of said first container.

16. A waste processing system as defined in claim 1, additionally comprising:

a valve to control the flow of wastewater from said wastewater stream into said first container.

17. A waste processing system as defined in claim 16, additionally comprising:

a valve to control the flow of said wastewater containing said contaminants bound to said microorganisms from said first container to said solid/liquid separator.

18. A waste processing system as defined in claim 1, wherein said solid/liquid separator comprises:

a dissolved air flotation system.

19. A waste processing system as defined in claim 1, additionally comprising:

a pump to pump said activated sludge including said contaminants bound to said microorganisms from said solid/liquid separator to said second container.

20. A waste processing system as defined in claim 1, additionally comprising:

a valve to control the flow of said activated sludge from said second container to said first container.

21. A waste processing system as defined in claim 1, additionally comprising:

a pump for removing a portion of the contents of said second container if and when the level of inert solids contained in said second container builds up to the point where said activated sludge is unduly reduced in strength, the remaining contents of said second container then being diluted by adding wastewater from said wastewater stream.

22. A waste processing system as defined in claim 21, additionally comprising:

a valve to control the flow of wastewater from said wastewater stream into said second container to dilute the contents thereof.

23. A waste processing system as defined in claim 1, additionally comprising:

apparatus for introducing a first conditioner into at said first container.

24. A waste processing system as defined in claim 23, wherein said first conditioner comprises:

a chemical to adjust the level of pH in said first container.

25. A waste processing system as defined in claim 23, wherein said first conditioner comprises:
a surfactant to improve the reaction process in said first container.

26. A waste processing system as defined in claim 1, wherein said apparatus for introducing said first conditioner is controlled to maintain the pH in said first container between approximately four and eleven.

27. A waste processing system as defined in claim 26, wherein said apparatus for introducing said first conditioner is controlled to maintain the pH in said first container between approximately 6.5 and 8.5.

28. A waste processing system as defined in claim 26, wherein said apparatus for introducing said first conditioner comprises:
a pump for pumping said first conditioner into said first container.

29. A waste processing system as defined in claim 1, additionally comprising:
apparatus for introducing a second conditioner into at said second container.

30. A waste processing system as defined in claim 29, wherein said apparatus for introducing said second conditioner is controlled to maintain the level of said second conditioner at a level which facilitates and enhances the efficiency of digestion.

31. A waste processing system as defined in claim 30, wherein said second conditioner comprises a nitrogen-based nutrient.

32. A waste processing system as defined in claim 30, wherein said second conditioner comprises:
a second strain of microorganisms to consume any microorganisms which may have died.

33. A waste processing system as defined in claim 29, wherein said second conditioner comprises:
a surfactant to improve a reaction process in which substantially complete digestion of contaminants occurs.

34. A waste processing system as defined in claim 29, wherein said second conditioner is added to said wastewater containing said contaminants bound to said microorganisms from said first container, with the resulting mixture being fed into said solid/liquid separator.

35. A waste processing system as defined in claim 29, wherein said second conditioner comprises:
a chemical flocculent material which causes solids to clump together.

36. A waste processing system as defined in claim 35, wherein said chemical flocculent comprises:
a cationic emulsion polymer.

37. A method of removing contaminants from a wastewater stream, comprising:

admitting wastewater from said wastewater stream into a first container;

introducing activated sludge into said first container to react with said wastewater admitted into said first container to cause said contaminants to bind to microorganisms contained in said activated sludge;

directing said wastewater previously admitted into said first container and containing said contaminants bound to said microorganisms into a solid/liquid separator having as a first output wastewater from which said contaminants bound to said microorganisms have been removed, said solid/liquid separator also having as a second output an activated sludge including said contaminants bound to said microorganisms; and providing said activated sludge including said contaminants bound to said microorganisms from said solid/liquid separator into a second container containing a sufficiently high concentration of activated sludge to ensure substantially complete digestion of said contaminants, said activated sludge in said second container comprising the source of said activated sludge which is introduced into said first container.

38. An aerobic, anaerobic, anoxic, or multiple aeration mode method of removing contaminants contained in a wastewater stream, comprising:

admitting wastewater from said wastewater stream into a contact tank;

introducing activated sludge containing microorganisms into said contact tank to react with said wastewater admitted into said contact tank to cause said contaminants to bind to microorganisms contained in said activated sludge;

aerating and mixing the contents of said contact tank;

directing said wastewater previously admitted into said contact tank and containing said contaminants bound to said microorganisms into a solid/liquid separator having as a first output wastewater from which said contaminants bound to said microorganisms have been removed, said solid/liquid separator also having as a second output an activated sludge including said contaminants bound to said microorganisms;

providing said activated sludge including said contaminants bound to said microorganisms from said solid/liquid separator into a digester tank containing a sufficiently high concentration of activated sludge to ensure substantially complete digestion of said contaminants, said activated sludge in said digester tank comprising the source of said activated sludge which is introduced into said contact tank; and aerating and mixing the contents of said digester tank.

* * * * *